United States Patent [19]

Robertson et al.

[11] Patent Number: 5,063,104
[45] Date of Patent: Nov. 5, 1991

[54] FIBROUS BASE WEB BONDING SYSTEM AND METHOD

[75] Inventors: Diane M. Robertson, West Suffield; Ludmila Byalik, West Hartford, both of Conn.

[73] Assignee: The Dexter Corporation, Windsor Locks, Conn.

[21] Appl. No.: 460,405

[22] Filed: Jan. 3, 1990

[51] Int. Cl.$^5$ .................. A22C 11/00; B32B 33/00; B32B 27/04; B65D 8/34
[52] U.S. Cl. .................. 428/286; 138/118.1; 138/146; 426/105; 426/135; 427/342; 427/411; 428/34.3; 428/34.8; 428/35.7; 428/287; 428/511
[58] Field of Search .................. 138/118.1, 146; 427/342, 411; 426/105, 135; 428/34.3, 34.8, 286, 287

[56] References Cited

U.S. PATENT DOCUMENTS

| | | | |
|---|---|---|---|
| 3,468,696 | 9/1969 | Conway et al. | 428/413 |
| 3,640,734 | 2/1972 | Oppenheimer et al. | 525/61 |
| 3,640,735 | 2/1972 | Oppenheimer et al. | 525/61 |
| 3,833,022 | 9/1974 | Turbak et al. | 428/34.8 |
| 4,142,013 | 2/1979 | Hammer et al. | 428/34.8 |
| 4,161,968 | 7/1979 | Rasmussen et al. | 428/34.8 |
| 4,218,286 | 8/1980 | Jones | 138/118.1 |
| 4,248,900 | 2/1981 | Hammer et al. | 428/499 |
| 4,563,376 | 1/1986 | Hammer et al. | 428/34.8 |
| 4,592,795 | 6/1986 | Bridgeford | 428/34.8 |
| 4,670,273 | 6/1987 | Hammer et al. | 138/118.1 |
| 4,762,564 | 8/1988 | Bridgeford | 428/289 |
| 4,788,087 | 11/1988 | Wilke et al. | 138/118.1 |
| 4,851,245 | 7/1989 | Hisazumi et al. | 138/118.1 |
| 4,915,963 | 4/1990 | Lustig et al. | 428/34 |
| 4,952,431 | 8/1990 | Robertson et al. | 428/34.8 |
| 4,967,798 | 11/1990 | Hammer et al. | 138/118.1 |

*Primary Examiner*—James C. Cannon
*Attorney, Agent, or Firm*—Chilton, Alix & Van Kirk

[57] ABSTRACT

A bonded porous sheet material for use in the manufacture of food casing, said material being produced by treating a fibrous web with a thermoplastic film forming material which bonds the fibers of the web and imparts high alkaline strength to the treated wet and subsequently treating the bonded fiber web with a solution of film forming material and an insolubilizing agent for the film forming material.

20 Claims, No Drawings

FIBROUS BASE WEB BONDING SYSTEM AND METHOD

BACKGROUND AND SUMMARY OF THE INVENTION

The present invention relates generally to casing used for packaging food products such as sausage and the like. More particularly it is concerned with a new and improved binder system used as the bonding agent for fibrous base webs used in making reinforced casing.

Heretofore it has been the practice to make reinforced films, tubing, casings or skins for food products and the like by the encasement of bonded fibrous base papers or substrates in a film forming material. In order to withstand the treatment conditions at the time of encasement, the substrate must possess substantial dry strength, wet strength and caustic strength as well as good absorbency. Heretofore substrates of this type have been prepared by bonding a preformed and dried paper or fibrous base web with a dilute (1%) viscose solution followed by the steps of drying, regenerating the cellulose, washing and redrying. This bonding operation using the dilute viscose solution was sufficient to impart enough caustic resistance to the bonded substrate to retain its structural integrity during the final casing-forming operations where treatment with a more concentrated viscose solution was carried out under highly alkaline conditions. After undergoing bonding the substrate must retain its porous, absorbent characteristics in order to permit complete impregnation and encasement by the concentrated viscose solution. Typically the casing-forming operation includes the steps of forming the substrate into a cylindrical tube, impregnating and encasing the substrate tube with a highly caustic viscose solution, regenerating the impregnate with acid, washing to remove excess acid and viscose and drying of the final reinforced film or casing. This process is set forth in greater detail in the Underwood U.S. Pat. No. 3,135,613 entitled "Impregnated Paper Webs and Method of Making Sausage Casing Thereof", thus clarifying the sequential evolution of the base web through the bonded substrate phase and then into the reinforced casing.

The tubular casings produced in the manner set forth possess enough strength and burst resistance to be particularly well suited for enclosing meat and other food products that are injected into the interior of the tubes under pressure. They thereby provide firm uniform enclosures for well known products such as sausage, bologna and the like as well as other food products.

Various patents subsequent to the aforementioned U.S. Pat. No. 3,135,613 have discussed the use of alternative materials for bonding the paper webs to provide appropriate casing substrates. In selecting bonding materials other than the commercially employed acid-regenerated dilute viscose, it is important that the bonding materials meet both the processing and performance requirements of the food casings to be produced therefrom. Additionally, the fibrous base web to which the bonding agent is to be applied must exhibit sufficient strength to withstand the stresses exerted during both the bonding and coating operations. The amount of bonding agent employed should not interfere with subsequent viscose penetration during the casing manufacturing process such that there is a loss of strength in the casing, or that there is a detrimental effect on the appearance of the casing. Also, the bonding agent should be one which will not cause the substrate to become discolored during exposure to the conditions of the casing forming process. In U.S. Pat. No. 3,484,256 to Chiu et al., it is suggested that the dilute viscose bonding treatment be replaced by the use of a bonding agent that consists of a mixture of a cationic thermosetting resin and a polyacrylamide resin. A bonding mixture of a cationic alkaline curing resin and carboxymethyl cellulose has been disclosed by Conway in U.S. Pat. No. 3,468,696 as a substitute wet strength bonding treatment. The U.S. Pat. Nos. 3,640,734 and 3,640,735 to Oppenheimer et.al. teach the formation of substrates using insolubilized poly(vinyl alcohol) as a wet strength sizing agent while the Jones et.al. U.S. Pat. No. 4,218,286 teaches the use of a three component binder mixture to obtain improved alkaline wet strength and good absorbency.

More recently U.S. Pat. Nos. 4,592,795, 4,762,564 and 4,789,006 to Bridgeford et.al. also have indicated that viscose can be replaced by other materials to eliminate the toxic and noxious sulfur containing chemical species associated with viscose manufacture and use. However, those patents merely indicate that the binder for the casing substrate should be the conventional binders mentioned hereinbefore.

The aforementioned binder materials, whether used alone or in combination, frequently provide some of the desired characteristics but not all of those characteristics. For example, the use of poly(vinyl alcohol) will provide a desirable level of dry tensile strength and alkaline strength but poor wet tensile strength and absorption characteristics. Conversely, the use of various film forming materials such as hydroxyethyl cellulose in conjunction with appropriate cross linking agents, such as dialdehyde cross linkers, will have the opposite effect from that achieved by the poly(vinyl alcohol). They exhibit good wet tensile strength and absorption characteristics but relatively poor dry tensile and alkaline strength. Unfortunately, mixtures of these materials also fail to provide all of the desired characteristics.

It is therefore an object of the present invention to provide a new and improved binder system capable of imparting those characteristics heretofore associated with the dilute viscose bonded material but without the attendant environmental problems associated with the use of viscose. Included in this object is the provision for a binder system that will provide high alkaline strength combined with excellent wet strength and modulus, good absorbency and extensibility, a lack of discoloration when combined with a subsequent viscose treatment and high penetration of the casing forming material into the bonded web. Additionally, the binder material advantageously provides these advantages in the context of a multi-step treatment that must be employed in the proper manner, that is, in the correct sequence.

Other advantages would be in part obvious and in part pointed out more in detail hereinafter.

These and related objects and advantages are obtained by providing a bonded, porous, fibrous sheet material for use in the manufacture of food casings and the like comprising a fibrous base web containing about 10% by weight and less of a specific bonding system. That system comprises an initial treatment with a solution containing thermoplastic materials such as poly(vinyl alcohol) and a subsequent treatment with a combined film forming material and an insolubilizing agent for the film forming material. The treatment with poly(vinyl alcohol) is effective to impart high alkaline or caustic strength to the base web material while the second treatment is effective to impart high wet strength to the first treated material without substantially reducing the alkaline strength thereof. It is necessary that the two step treatment be conducted in the specific order indicated in order to achieve the appropriate combination of features that include high dry strength and alkaline strength coupled with high wet strength and absorption.

The invention accordingly comprises the several steps and the relation of one or more of such steps with respect to each of the others and the article possessing the features, properties and relation of elements exemplified in the following detail disclosure.

DESCRIPTION OF A PREFERRED EMBODIMENT

According to the present invention the foregoing and related advantages can be achieved by bonding a fibrous base web with a bonding system that consists of a specific sequence of bonding treatments, namely, an initial bonding with a thermoplastic material such as poly(vinyl alcohol) and a subsequent bonding with an insolubilized film forming material. This combination imparts to the base web substantial resistance to degradation in the highly caustic casing forming solution yet permits the rapid penetration of that solution into the substrate structure. Additionally, the associated casing manufacturing operations are accomplished in a facile and more effective manner without necessitating substantial alterations in the equipment or techniques employed.

Briefly, the process comprises the steps of forming a dilute suspension of cellulosic fibers, such as manila hemp fibers, and thereafter forming a fibrous base web from the suspension. The base web is dried and then bonded using the two step bonding system of the present invention. In this connection it should be noted that frequently the base web materials themselves are bonded by using beater added materials to provide a bonded web without a subsequent bonding process. However, the bonding treatment of the present invention has been found to be most effective when utilized as a post web formation system.

The base web for the casing substrate is generally composed of the natural fibers of pure cellulose and preferably comprises the long, light weight and nonhydrated fibers of the *Musa Textilis* species, typical of which are hemp fibers. Webs made from this material are generally soft, porous papers of uniform texture and thickness and posses tensile strength ratios close to unity, that is, a substantially equal tensile strength in both the machine and transverse direction. However, it will be appreciated that the tensile ratio may vary from about 0.5 to about 1.0 where such is desired.

It is imperative that the bonding agent utilized, namely the two step system of the present invention, not only imparts to the web a resistance to highly caustic conditions, but also provides no significant interference with the absorption characteristics of the bonded substrate. Preferably the bonding agent should improve the secure adhesion of the casing forming material to the reinforced substrate since it is believed that secure bonding therebetween results in substantial improvement in the burst strength of the resultant casing. At the same time, it should be kept in mind that the web should be devoid, at least as far as possible, of impregnates that might interfere with both the absorption and bonding mechanism. It is therefore necessary that the bonding agent utilized cause as little resistance as possible to the penetration of the casing forming coating into the reinforcing substrate material.

As mentioned, the bonding system of the present invention is a combination of two separate steps or stages that are performed in a specific sequence. The first step involves the treatment of the base web with a thermoplastic film forming material which imparts resistance to alkaline attack. In the preferred embodiment, the thermoplastic film former consists of an aqueous solution of poly(vinyl alcohol). The second step or stage of the binder system involves the use of a film former that is preferably a thermosetting material mixed with a cross linking or insolubilizing agent. This second stage should have the beneficial quality of imparting to the thermoplastic treated web the additional characteristic of high wet strength and receptivity to viscose absorption without severely impacting on the caustic strength imparted by the first stage treatment.

Although each of the bonding steps can be applied to the base web using various standard application techniques, it is generally preferred that the bonding system be incorporated into the base web material by immersing the web in an aqueous solution of the bonding material and subsequently drying the treated web. In other words, it is generally preferred that the bonding be carried out by dip coating in the aqueous binder solution to apply an appropriate coating level of the binder material thereon. The treated web is then dried at each stage or otherwise treated to fix the binder in the web.

As mentioned, in the preferred embodiment of the present invention an aqueous solution of poly(vinyl alcohol) is used as the first step or stage of the binder treating system. The expression "solution of poly(vinyl alcohol)" as used herein is intended to cover solutions of vinyl polymers where the poly(vinyl alcohol) moiety constitutes about 25% to 100% of the vinyl polymer present in the solution. Since poly(vinyl alcohol) is normally prepared by hydrolysis of polyvinyl esters such as poly(vinyl acetate), the degree of substitution will vary and the hydroxyl content may vary substantially. Accordingly, for the purpose of the present invention, it is generally preferred that the material exhibits the requisite effects of imparting caustic strength. This may be achieved at poly(vinyl alcohol) levels of 25% and less but preferably at levels where the polymer is predominantly poly(vinyl alcohol), that is, where poly(vinyl alcohol) levels are at least 50% and preferably about 80% or greater. Although various commercial products are available, it has been found that excellent results are obtained when using a fully hydrolized (98-99% hydrolysis) aqueous poly(vinyl alcohol) solution such as the material sold by Air Products Co. under the trademark "Airvol 350" or the super hydrolized (99+% hydrolysis) solutions sold under the trademark "Airvol 165".

After application of the poly(vinyl alcohol) to the base web material, the web is dried or otherwise treated to bond the web material prior to the second stage of the bonding operation.

The concentration of the poly(vinyl alcohol) in the aqueous solution may vary substantially depending on not only the fiber composition of the base web material but also the type of bonding treatment employed and the machine conditions encountered during the treating operation. The concentration of the poly(vinyl alcohol) within its aqueous dispersing medium is usually less than 5% by weight and typically falls within the range of from about 1% to 3% by weight. In this connection excellent results have been achieved using a poly(vinyl alcohol) concentration within the range of 1.5% to 2.5% by weight.

The second step of the binder system is undertaken subsequent to the first binder treatment and involves the use of a film former and crosslinking agent. The film former preferably is a thermosetting resin capable of imparting high wet strength and receptivity to the subsequent casing forming operation. Although various film formers may be employed, the preferred materials are cellulose based materials such as hydroxyethyl cellulose, a nonionic polymer sold by Aqualon Co. under the name "Natrasol 250", cross linked with a dialdehyde or a glyoxylated polyacrylamide. Other cellulose based film formers that may be used include hydroxypropyl cellulose, hydroxypropylmethyl cellulose, carboxymethyl cellulose and methyl cellulose. Additional film formers include cationic and anionic starches, and modified proteins such as casein or soy.

The insolubilizing or cross linking agents employed with the film formers of the second stage include not only dialdehydes, such as the material sold by American Hoechst Company under the name "Glyoxal 40T" but also alkaline curing resins such as the polymeric reaction products of epichlorohydrine and a polyamide, melamine formaldehyde, glyoxylated polyacrylamides, and multivalent metal ion complexes such as ammonium zirconium carbonate, inorganic salts such as sodium tetraborate and aluminum sulfate, urea formaldehyde and polyamides.

The second stage film formers and insolubilizing agents also are employed as dilute aqueous solutions and each are present at concentrations of less than about 5% by weight and, in some instances, as low as 0.2%. Typically, the film former and insolubilizing agent each are present at concentrations between 0.2% and 3% with the ratio of insolubilizing agent to film former falling within the range of from about 1 to 10 to about 1 to 1. As will be appreciated, the concentration of the specific materials utilized will depend upon the ability of that material to achieve the desired wet strength characteristics and absorption at the concentration levels employed.

The proportion of first stage to second stage material does not appear to significantly affect the end result and excellent results have been achieved with a ratio of first stage to second stage ranging from 3 to 1, to 1 to 3. Additionally, the extent of total binder pickup by the base web material may vary significantly from as little as 0.5% up to about 10% by weight with the typical range falling near the lower end of that scale, namely, within the range of about 2% to 6% by weight.

Generally it is advantageous to add to the binder solution very small amounts of a surfactant as an absorption aid. In this connection materials such as the nonionic alkylaryl polyether alcohols may be used. For example, the octylphenoxy polyethoxy ethanol sold by Rohm and Hass under the Trademark "Triton X114" has been effectively used. Other surfactants include nonylphenoxy, poly(ethyleneoxy)ethanols, block copolymers of ethylene oxide and propylene oxide, trimethylnonyl polyethylene glycol ethers, ethoxylated alkyl phenols and alcohols and alkylaryl polyether alcohols. The surfactants are used in the dilute binder solution in concentrations well below 1% by weight and, in fact, at concentrations below 0.1% so as to avoid loss of wet strength in the bonded substrate. Typically, concentrations of about 0.01 to 0.05% by weight are used.

As mentioned, the bonded substrate not only exhibits improved wet strength and caustic tensile strength, e.g., caustic tensile strength greater than 300 grams, but also retains the high degree of its porous absorbent character in order to permit impregnation and encasement during the final casing forming operation. Generally, the porosity of the bonded substrate can be measured in accordance with TAPPI test method T251-pm-75, and exhibits a Gurley porosity greater than 300 liters per minute. The porosity will vary with the weight of the base web material and typically falls within the range of about 500 to 1,500 liters per minute. Lighter sheets will, of course, have a higher porosity while heavier weight material exhibit lower porosities. For example, in accordance with the present invention, the porosity of the bonded substrate may fall within the range of about 500 to 1,200 liters per minute. As will be appreciated the bonded substrate's wet and caustic tensile strength characteristics also render the material well suited for use as teabag paper, particularly for herbal teas. Additionally, the two stage bonding formulation may be employed to form the casing or skin on other bonded web material such as viscose bonded fibrous webs.

Having generally described the invention, the following examples are included for purposes of illustration so that the invention may be more readily understood and are in no way intended to limit the scope of the invention unless otherwise specifically indicated. All amounts are on a weight basis unless otherwise specified.

In the series of examples set forth, the base fibrous web material consisted of 100% hemp fiber sheet material having a ream weight of 14.2 lbs. (23.7 grams per square meter) and an untreated porosity of 650 liters per minute.

EXAMPLE 1

The standard base web material was dipped into an aqueous solution containing 2% by weight of poly(vinyl alcohol) (Airvol 350) and dried. The dried sheet was subsequently dipped into an aqueous solution consisting of 1.5% by weight of hydroxyethyl cellulose and 0.3% by weight of a dialdehyde sold under the tradename "Glyoxal 40T". The sheet was again dried and tested for the properties that are listed in Table 1.

EXAMPLE 2

The standard base web was treated as in Example 1, except that the poly(vinyl alcohol) solution contained 0.025% of the surfactant "Triton X114" and the second binder stage used a solution containing 2% by weight of a cationic starch sold under the name "Cato Size 67" by National Starch and 1.7% by weight of a glyoxylated polyacrylamide. The resultant double dipped material was then dried in an oven at 300of for 30 seconds and tested for the properties listed in Table 1.

The procedure of this example was repeated except that the second binder stage employed a solution containing 1% by weight of sodium carboxymethyl cellulose and 0.5% by weight of a thermosetting cationic epechlorohydrin-polyamide reaction product sold by Hercules Incorporated under the tradename "Kymene-557H".

This example was also repeated using as the second bonding stage a solution containing 2% by weight of a modified milk protein sold under the name "Casein HC200" by National Casein Company, 1.4% by weight of the glyoxylated polycrylamide sold under the name "Parez 631NC" by American Cyanamide, 0.35% by weight of the surfactant "Triton X114" and 0.3% ammonium chloride.

In both of these additional variations from Example 2 the wet tensile was comparable while the dry tensile and caustic strength was substantially elevated relative to the Example 2 material and the waterclimb was somewhat higher.

EXAMPLE 3

The procedure of Example 1 was repeated except that the second binder stage was replaced by a solution containing 1.5% by weight of sodium carboxymethyl cellulose and 0.3% by weight of the dialdehyde "Glyoxal 40T". The treated material was dried on a heated drum and the properties of the resultant material are set forth in Table 1.

As indicated in the foregoing examples, Table 1 sets forth the properties of the various examples. In addition that table includes data resulting from treatment of the standard base web with a dilute viscose solution, with poly(vinyl alcohol) alone, with a film former and cross-linking agent alone, with a mixture of the poly(vinyl alcohol), film former and cross linking agent with and the dual treatment of Example 1 except that the sequence of stages was reversed.

As can be seen from the data set forth in Table 1, the material produced in accordance with the dual binder system of the present invention exhibits dry tensile, wet tensile, caustic strength and waterclimb all substantially comparable to the standard dilute viscose bonded substrate. On the other hand, the use of poly(vinyl alcohol) alone, while achieving a high caustic strength, exhibits a very poor wet tensile strength and a relatively high waterclimb. Treatment of the base web material with the film former alone or as mixed with the insolubilizing agent and poly(vinyl alcohol) resulted in extremely poor caustic strength characteristic. It should also be noted that a similar result is achieved where the procedure of Example 1 is reversed so that the poly(vinyl alcohol) binder treatment is subsequent to the film former treatment.

EXAMPLE 4

The procedure of Example 1 was repeated except that the concentration of the binder materials were varied as set forth in Table II. The properties for the different materials are also set forth and reveal excellent results.

EXAMPLE 5

The procedure of Example 2 was repeated except that the second binder stage used carboxymethyl cellulose and "Kymene 557H" in the amounts indicated in Table III. The resultant substrates were dried at 325° F. for the first two formulations and at 300° F. for the last two, both for 30 seconds.

EXAMPLE 6

The procedure of Example 1 was repeated except that the amount of hydroxyethyl cellulose was increased to 2.0% and the cross linking material was a glyoxylated polyacrylamide sold under the trademark "Parez 631NC". The resultant substrate exhibited a machine direction caustic tensile of 530, wet tensile of 1495, wet elongation of 5.7 and waterclimb of 12.9.

As will be apparent to persons skilled in the art, various modifications and adaptations of the process and products described above will become readily apparent without departing from the spirit and scope of the invention.

TABLE I

| | Binder System | Basis Wt. (g/m$^2$) | Porosity (l/min) | Elongation Dry | Elongation Wet | Dry Tensile MD | Wet Tensile MD | Wet Tensile CD | Caustic Tensile MD | Caustic Tensile CD | Water Climb MD | Water Climb CD |
|---|---|---|---|---|---|---|---|---|---|---|---|---|
| 1. | Dilute (1%) Viscose | 24.5 | 525 | 4.6 | 7.1 | 5500 | 1410 | 1095 | 565 | 410 | 11.4 | 12.8 |
| 2. | Polyvinyl Alcohol | 25.0 | 545 | 3.6 | 5.0 | 5300 | 600 | 500 | 680 | 470 | 15.1 | 17.5 |
| 3. | Hydroxyethyl Cellulose | 24.6 | 645 | 2.5 | 3.6 | 3820 | 1380 | 940 | 0 | 0 | 5.9 | 5.5 |
| 4. | Mixture of 2 and 3 | 26.6 | 558 | 3.7 | 4.3 | 5075 | 1745 | 1360 | 95 | 80 | 6.0 | 6.4 |
| 5. | Example 1 | 25.7 | 560 | 4.0 | 6.3 | 5000 | 1980 | 1415 | 660 | 505 | 9.9 | 10.7 |
| 6. | Example 1 with stages reversed | 26.0 | 571 | 2.7 | 3.4 | 4780 | 1300 | 1100 | 55 | 38 | 6.5 | 7.9 |
| 7. | Example 2 | 26.7 | 593 | 2.0 | 5.0 | 4700 | 1652 | 1225 | 430 | 325 | 13.8 | 13.8 |
| 8. | Example 3 | 25.8 | 501 | 4.0 | 8.2 | 5600 | 2050 | 1675 | 565 | 430 | 13.2 | 13.8 |

TABLE II

| Poly-vinyl Alc | Hydroxy-ethyl Cellul. | Dialde. | Basis Wt. (g/m$^2$) | Poros. | Elongation Dry | Elongation Wet | Dry Tens | Wet Tensile MD | Wet Tensile CD | Caustic Tensile MD | Caustic Tensile CD | Water Climb MD | Water Climb CD |
|---|---|---|---|---|---|---|---|---|---|---|---|---|---|
| 2.5% | 2.0% | 1.0% | 25.9 | 504 | 3.7 | 4.6 | 5200 | 2350 | 1675 | 580 | 475 | 13.7 | 15.0 |
| 2.5% | 1.5% | 0.3% | 25.6 | 500 | 4.0 | 6.8 | 5400 | 1955 | 1480 | 720 | 440 | 10.9 | 11.4 |
| 2.0% | 2.0% | 1.0% | 25.9 | 512 | 3.4 | 5.1 | 5200 | 2300 | 1740 | 705 | 475 | 14.2 | 14.8 |
| 2.0% | 2.0% | 0.5% | 26.3 | 531 | 3.5 | 4.9 | 5775 | 2225 | 1660 | 710 | 505 | 12.3 | 13.1 |
| 2.0% | 1.5% | 0.4% | 26.1 | 531 | 3.6 | 5.0 | 5050 | 1800 | 1510 | 625 | 480 | 10.7 | 11.7 |
| 1.5% | 2.0% | 0.5% | 25.9 | 555 | 3.3 | 4.6 | 5225 | 1956 | 1420 | 485 | 370 | 12.1 | 14.1 |

TABLE III

| Poly-vinyl Alc | Triton | CMC | Kymene | Basis Wt. | Poros. | Elongation Dry | Elongation Wet | Dry Tens | Wet Tensile MD | Wet Tensile CD | Caustic Tensile MD | Caustic Tensile CD | Water Climb MD | Water Climb CD |
|---|---|---|---|---|---|---|---|---|---|---|---|---|---|---|
| 2.5% | 0.05% | 1.0% | 0.25% | 26.0 | 563 | 3.7 | 7.9 | 5875 | 1410 | 1140 | 950 | 675 | 13.2 | 14.5 |

TABLE III-continued

| Polyvinyl Alc | Triton | CMC | Kymene | Basis Wt. | Poros. | Elongation Dry | Elongation Wet | Dry Tens | Wet Tensile MD | Wet Tensile CD | Caustic Tensile MD | Caustic Tensile CD | Water Climb MD | Water Climb CD |
| --- | --- | --- | --- | --- | --- | --- | --- | --- | --- | --- | --- | --- | --- | --- |
| 2.5% | 0.05% | 0.7% | 0.25% | 25.8 | 580 | 3.9 | 7.9 | 5775 | 1355 | 1110 | 950 | 725 | 13.4 | 15.0 |
| 2.0% | 0.036% | 0.8% | 0.4% | 25.7 | 567 | 4.0 | 6.7 | 5850 | 1310 | 1035 | 830 | 665 | 14.0 | 15.8 |
| 2.0% | 0.025% | 0.5% | 0.25% | 26.0 | 590 | 3.8 | 6.9 | 5550 | 1400 | 1035 | 860 | 585 | 14.9 | 16.0 |

We claim:

1. A bonded porous fibrous sheet material for use in the manufacture of food casings and the like comprising a fibrous base web containing about 10% by weight and less of a bonding system comprising a first treatment of a thermoplastic film forming material effective for imparting high alkaline strength to the base web and a subsequent treatment of a film forming material and an insolubilizing agent for the film forming material, said subsequent treatment being effective to impart high wet strength and absorption to the first treated web without substantially reducing the alkaline strength thereof.

2. The bonded sheet material of claim 1 wherein the thermoplastic film forming material is poly(vinyl alcohol).

3. The bonded sheet material of claim 1 wherein the thermoplastic film forming material includes at least about 25% by weight of poly(vinyl alcohol).

4. The bonded sheet material of claim 1 wherein the thermoplastic film forming material comprises at least about 80% by weight of poly(vinyl alcohol).

5. The bonded sheet material of claim 1 wherein the film forming material of the subsequent treatment is a cellulose based material.

6. The bonded sheet material of claim 1 wherein the cellulose based material is selected from the group consisting of hydroxyethyl cellulose, hydroxypropyl cellulose, hydroxypropylmethyl cellulose, carboxymethyl cellulose and methyl cellulose.

7. The bonded sheet material of claim 1 wherein the film forming material of the subsequent treatment is selected from the group consisting of cellulose based materials, cationic and anionic starches and modified proteins.

8. The bonded sheet material of claim 1 wherein the insolubilizing agent is selected from the group consisting of dialdehydes, alkaline curing resins, melamine formaldehyde, glyoxylated polyacrylamides, multivalent metal ions, inorganic salts, urea formaldehyde and polyamides.

9. The bonded sheet material of claim 1 wherein the ratio of insolubilizing agent to film former falls within the range of about 1:10 to 1:1.

10. The bonded sheet material of claim 1 wherein the amount of the binder system in the base web falls within the range of about 2% to 6% by weight.

11. The bonded sheet material of claim 1 wherein the binder system includes less than 1% by weight of a surfactant.

12. The bonded sheet material of claim 1 wherein the sheet material has a caustic tensile strength of at least about 300 grams.

13. A food packaging material comprising a fibrous base web and a coating thereon comprising a first treatment of a poly(vinyl alcohol) film forming material and a subsequent treatment of a film forming material selected from the group consisting of celulose based materials, cationic and anionic starches and modified proteins and an insolubilizing agent for the film forming material selected from the group consisting of dialdehydes, alkaline curing resins, melamine formaldehyde, glyoxylated polyacrylamides, multivalent metal ions, inorganic salts, urea formaldehyde and polyamides.

14. A process for producing a bonded porous fibrous sheet material for use in the manufacture of food casings comprising the steps of treatment the base web material with a first bonding solution of a thermoplastic film forming material effective for imparting high alkaline strength to the web and subsequently treating the thermoplastic bonded web with a solution of a film forming material and an insolubilizing agent for the film forming material, said subsequent treatment being effective to impart high wet strength and absorption to the first treated web without substantially reducing the alkaline strength thereof.

15. The process of claim 13 wherein the first bonding solution is a solution of poly(vinyl alcohol).

16. The process of claim 15 wherein the solution of poly(vinyl alcohol) comprises an aqueous solution of vinyl polymers wherein the poly(vinyl alcohol) moiety constitutes at least about 25% by weight of the vinyl polymer content.

17. The process of claim 16 wherein the poly(vinyl alcohol) moiety constitutes at least about 80% by weight of the vinyl polymer content.

18. The process of claim 14 wherein the first bonding solution is an aqueous solution having a concentration of thermoplastic material of about 5% by weight and less.

19. The process of claim 16 wherein the concentration of thermoplastic material falls within the range of about 5% to 1.5% by weight.

20. The process of claim 14 wherein the film forming solution of the subsequent treatment is an aqueous solution having a concentration of film forming material of about 8% by weight and less.

* * * * *

UNITED STATES PATENT AND TRADEMARK OFFICE
CERTIFICATE OF CORRECTION

PATENT NO. : 5,063,104

DATED : November 5, 1991

INVENTOR(S) : Robertson et al

It is certified that error appears in the above-identified patent and that said Letters Patent is hereby corrected as shown below:

Column 10, line 28, Claim 14, "treatment" should be --treating--.

Signed and Sealed this

Twenty-third Day of March, 1993

Attest:

STEPHEN G. KUNIN

*Attesting Officer*     Acting Commissioner of Patents and Trademarks